Figure 1:
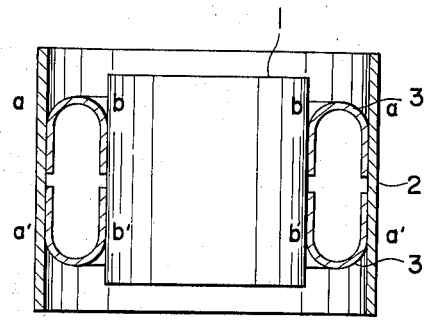

June 21, 1966 KUNIO NISHIOKA ETAL 3,257,107
AIR SPRING
Filed July 8, 1963 4 Sheets-Sheet 1

INVENTOR.
Kunio NISHIOKA,
Seiichi Nishimura, Seinosuke Kato
BY
attorney

INVENTOR.
Kunio NISHIOKA,
Seiichi Nishimura, Seinosuke Kato
BY
attorney

INVENTOR.
Kunio NISHIOKA,
Seiichi Nishimura, Seinosuke Kato
BY
attorney

June 21, 1966  KUNIO NISHIOKA ET AL  3,257,107
AIR SPRING

Filed July 8, 1963  4 Sheets-Sheet 4

INVENTOR.
Kunio NISHIOKA,
Seiichi Nishimura, Seinosuke Kato
BY
attorney

United States Patent Office 3,257,107
Patented June 21, 1966

3,257,107
AIR SPRING
Kunio Nishioka, Ukyo-ku, Kyoto, and Seiichi Nishimura and Seinosuke Kato, Nishinomiya, Japan, assignors to Sumitomo Metal Industries, Ltd., Osaka, Japan
Filed July 8, 1963, Ser. No. 293,360
Claims priority, application Japan, July 20, 1962, 37/30,970; Sept. 10, 1962, 37/38,890; Sept. 25, 1962, 37/42,105
3 Claims. (Cl. 267—65)

This invention relates to an air spring and, more particularly, to an air spring having an inner cylinder, an outer cylinder and a flexible circumferential member situated between said two cylinders, constituted to produce a restoring force aerodynamically in the lateral direction. The invention can be applied not only to air but also to any other gases.

The advantages of an air spring are in the points that the air spring can hold the load at a fixed level, and also that a constant natural frequency is obtained without any relation to the magnitude of the static load to be held by the air spring.

As is well known to those skilled in the art, it is necessary for a railway car to be provided with not only the spring action in the vertical direction, but also, in the lateral direction, and the lateral spring action is given substantially by a mechanical link mechanism. At present, a link mechanism is not used in some of the truck having an air spring but the air spring can effect the spring action in the lateral direction as well as in the vertical direction utilizing the inherent and excellent spring action in the vertical direction of a conventional air spring as it is. The actual utilization of the air spring for the purpose stated above has begun to be gradually put to practice. However, the principle on which the air spring is utilized is in that the restoring force in the lateral direction is obtained by the rigidity of the bellows of the air spring. Therefore, tests and researches have hitherto been made in order to get the proper spring constant which is derived from a combination of the kind of rubber used for bellows, the material and quantity of a reinforcing cord in the rubber and the cord angle. However, in the above case, the restoring force in the lateral direction is obtained by the rigidity of the rubber bellows of the air spring and, it results that the air spring represents such defects as (1) the spring constant decreases with the displacement of the air spring and becomes zero in the most cases, (2) the hysteresis loop between the restoring force and the displacement is large and the car body is not held at its correct position any more, and (3) the characteristics of the rubber bellows change in service.

The principal object of the invention is, therefore, to provide an air spring in which a restoring force in the lateral direction is obtained aerodynamically without utilizing the rigidity of the bellows of the air spring.

Another object of the invention is to provide an air spring having a mechanism in which an air spring, alone, can effect its spring action aerodynamically in both vertical and lateral direction.

Further object of the invention is to provide, in an air spring operating aerodynamically in both directions stated above, a mechanism in which the spring constant of the air spring can be selected properly.

Still further object of the invention is to provide, in an air spring stated above, a means by which the flexible circumferential members of the air spring are prevented from wearing out.

Figure 2:
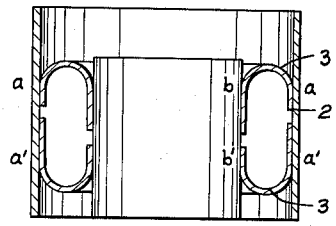
Figure 3:
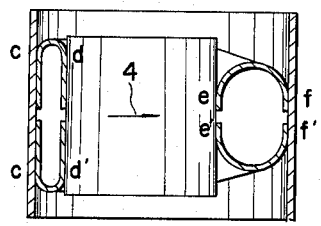
Figure 4:
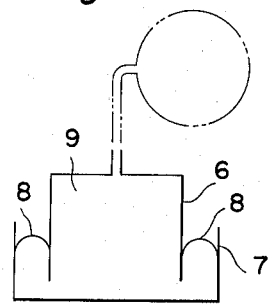
Figure 5:
Figure 6:
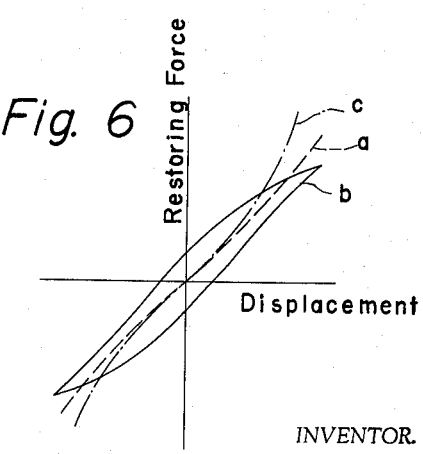
Figure 7A:
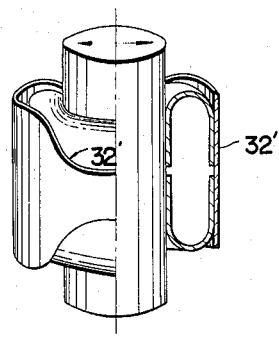
Figure 7B:
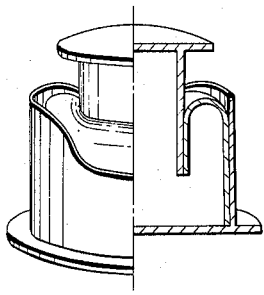
Figure 8:
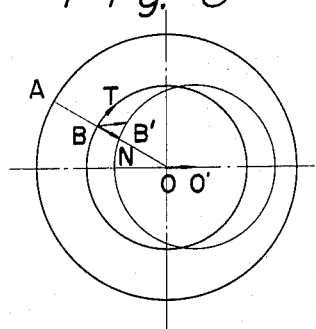
Figure 9A:
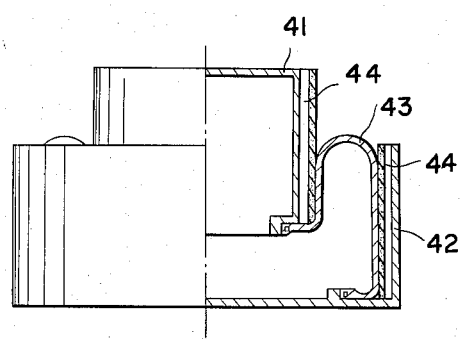
Figure 9B:
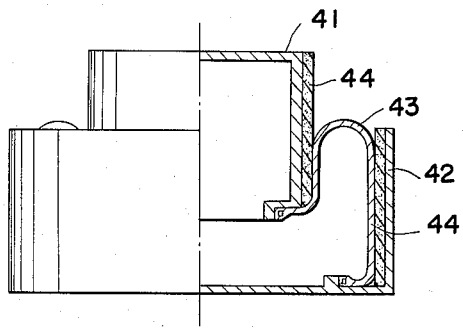
Figure 9C:
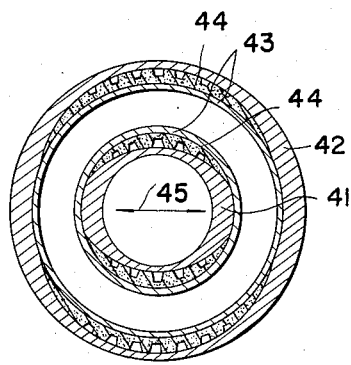
Figure 9D:
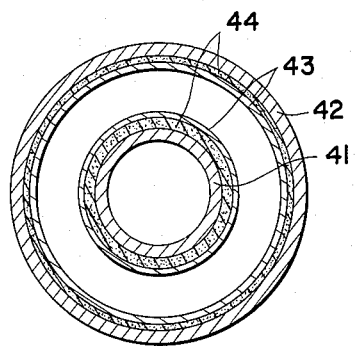
Figure 10A:
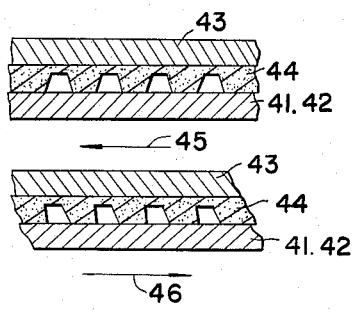
Figure 10B:
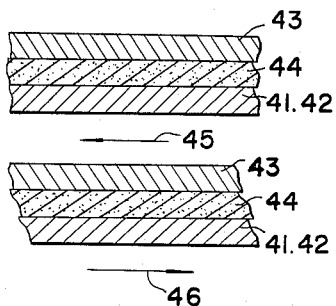
Figure 11:
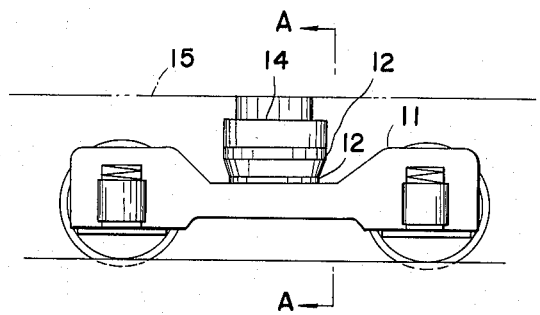
Figure 12:
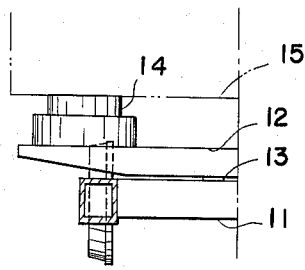

These objects will become apparent upon a study of the following specification and drawings of which:

FIG. 1 is a side elevation view in section of an embodiment of the air spring provided in accordance with the present invention in which the spring action of the air spring is effected laterally, FIG. 2 is an explanatory diagram of the action of the air spring shown in FIG. 1 in which the vertical action is explained, FIG. 3 is an explanatory diagram of the action of the air spring shown in FIG. 1 in which the lateral spring action is explained, FIG. 4 is a schematic elevation view of an embodiment of the air spring provided in accordance with the present invention in which the spring action of the air spring is effected laterally and vertically, FIG. 5 is an explanatory diagram of the action of the air spring shown in FIG. 4, FIG. 6 is a diagram showing the relation between the displacement in the lateral direction and the restoring force of the air spring (a) shown in FIG. 4 comparing to the ordinary air spring (b) and the conventional link mechanism (c), FIGS. 7a and 7b are perspective views in section of the air spring provided in accordance with the present invention in which the flexible circumferential members of the air spring are prevented from wearing out, FIG. 8 is an explanatory diagram in case of the lateral displacement, FIGS. 9a and 9b are side elevation views in section of embodiments of the air spring provided in accordance with the present invention in which the flexible circumferential members of the air spring are prevented from wearing out, FIG. 9c is a plan in section of the embodiment shown in FIG. 9a, FIG. 9d is a plan in section of the embodiment shown in FIG. 9b, FIGS. 10a and 10b are sectional views of an elastic body used in the embodiments shown in FIGS. 9a and 9b, FIG. 11 is a side elevation view in section of an embodiment of a truck used for railway cars provided with the air spring of the present invention, and FIG. 12 is a sectional view of the truck shown in FIG. 11 which is sectioned along line A—A.

In FIG. 1 to FIG. 3, the air spring shown acts as a spring substantially according to the variation in the pressure receiving area in the lateral direction, and does not act as a spring in the vertical direction, but the air spring can be displaced freely in the vertical direction.

In FIG. 1, a space suitable for moving inner cylinder 1 and outer cylinder 2 laterally as it is required is provided and two bodies (such as, for example, a car body and a truck, or vice versa) which are to restore the relative displacement to an equilibrium state are connected to the inner cylinder and the outer cylinder by means of a proper known technique, respectively. Gas-tight vessel, or circumferential member 3 is flexible and has the ends thereof secured to the inner surface of outer cylinder 2 and to the outer surface of inner cylinder 1, respectively. A pressurized gas is filled within the gas-tight vessel and the gas can be charged, supplemented into and/or removed from the vessel by a conventional means, not shown in the drawing, as in an ordinary gas-tight vessel. It is necessary to utilize material having low elongation, bending and shearing stiffness for gas-tight vessel 3. An example of such material is a rubber having the properties stated above and the rubber is applicable to the vessel. Sections $a$–$b$ and $a'$–$b'$ represent the cross sections of gas-tight vessel 3 and the form of the sections are nearly circular arc. A portion of gas-tight vessel 3 ought to contact the surfaces of inner cylinder 1 and outer cylinder 2 when the two cylinders move relative to each other. It is natural that the gas-tight vessel is formed to be a tubular ring sack.

When inner cylinder 1 is displaced relative to the outer cylinder 2 in the vertical direction as shown in FIG. 2 of the vessel does not change its magnitude and the two cylinders stand in equilibrium at any position. Therefore, in this case, the air spring has no rigidity in the vertical direction at all. On the contrary, as shown in FIG. 3, when the two cylinders displace in the lateral direction the pressure receiving area of the vessel is modified so that pressure receiving line $d$–$d'$ differs from pressure receiving line $e$–$e'$ resulting in a restoring force shown by arrow 4 produced on inner cylinder 1 until the length of pressure receiving line $d$–$d'$ is made equal to the length of pressure receiving line $e$–$e'$. Assuming that the two cylinders are tubular, restoring force F can be given approximately in the following formula for the whole circumference of the tubes;

$$F=\frac{\pi^2}{2}P_0 R_i \delta$$

where:

$P_0$=gas pressure
$R_i$=outer radius of inner cylinder 1
$\delta$=displacement in the lateral direction Therefore, it can be seen from the formula above that if gas pressure $P_0$ and the size of inner cylinder 1 are selected properly, an air spring with a desired rigidity in the lateral direction and with no rigidity in the vertical direction is obtained. As in this embodiment, when a restoring force is generated for the lateral displacement according to the variation of the pressure receiving area so that a spring action is generated, the restoring force is approximately proportional to the displacement. However, when a number of independent gas-tight chambers are affixed on the surfaces of the inner and outer cylinders, a spring action with a restoring force caused by the compressibility of the gas is obtained in addition to the restoring force caused by the variation of the pressure receiving area. The air spring explained above can be incorporated with a conventional air spring operating in the vertical direction and mounted on a railway car so that the air springs can be operated aerodynamically both in the vertical and lateral directions.

When the body suspension of a railway car is complicated by utilizing two kinds of air springs at the same time or the space on which the two kinds of air springs are mounted is limited, an air spring with a spring action in the vertical direction in addition to the restoring force in the lateral direction is provided and the construction thereof is shown in FIG. 4. In FIG. 4, flexible circumferential member 8 is affixed gas tightly to the outer surface of inner cylinder 6 and to the inner surface of outer cylinder 7 at the both ends thereof, respectively, and member 8 is made of such material as of low elongation, bending and shearing stiffness. The insides of inner cylinder 6 and outer cylinder 7 are communicating and are shielded against the atmosphere by means of a cover. The space between inner cylinder 6 and outer cylinder 7 is sealed hermetically by means of said member 8 so as to form a gas-tight chamber into which a gas is filled. The gas can be charged, supplemented into and/or removed from the chamber by a conventional means, as in an ordinary air spring vessel.

One of the two bodies, such as a car body and a truck, moving each other is secured to one of the two cylinders and the other to the other by any proper means. The air spring operates according to the compressibility of the gas as to the displacement in the vertical direction and according to the variation of the pressure receiving area as to the displacement in the lateral direction. Therefore, the spring action is fully based on an aerodynamic operation and the air spring has no defect that the conventional air spring has and the spring constant is proportional to the gas pressure in the chamber both in the vertical and lateral directions. Further, the vibration characteristics of the car body does not vary even when the weight of the car body varies.

An example of the railway car providing the air spring explained in FIG. 4 is shown in FIGS. 11 and 12. In the figures, cross beam 12 of truck 11 is supported rotatably on center plate 13 of truck 11 and air spring 14 is mounted between the cross beam (12) and a car body (15) and the inner side of the air spring is connected to the car body and the outer side to the cross beam of the truck. However, it is relized the connection of the car body and the truck can be reversed.

In FIG. 6, the relations in the lateral direction between the displacement and the restoring force are shown in the following railway car;

(a) A railway car provided with the air spring shown in FIG. 4, (b) A railway car provided with an ordinary bellows type air spring, (c) A railway car provided with a link mechanism in addition to a conventional bellows type air spring.

The abscissa of FIG. 6 designates the displacement and the ordinate the restoring force. It can be understood from the figure that the buffer action of the railway car shown in (a) is a similar buffer action of the railway car shown in (c).

In the air spring described above, it is obvious from the construction and operation of the air spring that the flexible circumferential member only deforms but makes no slip for the displacement in the vertical direction. However, there is a fear of the occurring of slip between said cylinders and said members to some extent in a plane perpendicular to the direction of the displacement for the displacement in the lateral direction.

As shown in FIG. 8, it is assumed that the inner cylinder displaces relative to the outer cylinder in the lateral direction and point B shifts to point B'. The shift from point B to point B' is divided into two components, one being component $\vec{BN}$ in the normal direction to the surface of the inner cylinder and the other being component $\vec{BT}$ in the tangential direction. The flexible circumferential member existing between the two cylinders is bent without any substantial resilience for the displacement in the normal direction and results no slip against the surface of the cylinders. However, for the displacement in the tangential direction the circumferential member is subjected to shearing force and has a tendency to slide the member on the face which is in contact with the outer cylinder. When the displacement in the tangential direction is small, the slip can be avoided due to the frictional force acting between the circumferential member and the cylinders. However, when the force to slip the member overcomes the frictional force, a slip occurs between the member and the cylinders partially and results an abrasion of the member so as to affect the life of the air spring. Therefore, it is proposed that the outer cylinder is cut off partially at the portion where the member is subjected to a frictional force due to the displacement in the tangential direction so that the shearing stiffness of the gas-tight vessel or the circumferential member is reduced, as shown in the air spring in FIG. 7. By reducing the shearing stiffness, the tangential force acting on a portion of the inner cylinder or the outer cylinder, which are in contact with the gas-tight vessel or the circumferential member, decreases for the same displacement in the lateral direction and therefore the slip on said portion can be reduced and also the abrasion of said member can be diminished.

In an embodiment shown in FIG. 7a the air spring shown in FIG. 1 is modified in that notch 32' is provided in outer cylinder 32 and in FIG. 7b the air spring shown in FIG. 4 is modified.

In FIGS. 9a to 9d and FIGS. 10a and 10b, embodiments are shown in which an elastic body is provided between the circumferential member and the cylinders in order to relieve the tangential force so that the member is prevented from wearing out. Elastic bodies 44 are secured tightly between inner cylinder 41 and circumferential member 43 and between circumferential member 43 and outer cylinder 42, respectively. When the displacement of the air spring in the lateral direction occurs only in the direction shown by arrow 45 in FIG. 9c, an elastic body of the crescent shape having low shearing stiffness is provided at a portion which receives the greatest tangential force, between member 43 and inner cylinder 41, between member 43 and outer cylinder 42 and/or between member 43 and both of inner cylinder 41 and outer cylinder 42. On the other hand, when the displacement of the air spring is not limited in a particular direction, an elastic body having uniform thickness is provided circumferentially around the wall of the cylinder which is in contact with the circumferential member. The material for the elastic body is preferable to have low shearing stiffness.

The deformation of an elastic body is shown in FIGS. 10a and 10b when the elastic body is subjected to shearing forces designated by arrows 45 and 46.

In conclusion, when the shearing stiffness of the elastic body is selected properly for the displacement in the lateral direction, the tangential force acting on between the flexible circumferential member, the elastic body and the inner cylinder or the outer cylinder does not exceed the frictional force acting on them and it results that, the circumferential member is prevented from wearing out due to the slip.

What is claimed is:

1. An air spring comprising an outer cylindrical member closed at one end, an inner cylindrical member closed at one end, means mounting said cylinders for relative vertical and lateral movement, a U-shaped flexible member secured at the ends of the legs of the U to said inner and outer cylinders, and means for reducing the rubbing of said flexible member on said cylindrical members at zones located at right angles to the direction of lateral movement, said means comprising a relieved section of the outer cylinder member.

2. An air spring comprising an outer cylindrical member closed at one end, an inner cylindrical member closed at one end, means mounting said cylinders for relative vertical and lateral movement, a U-shaped flexible member secured at the ends of the legs of the U to said inner and outer cylinders, and means for reducing the rubbing of said flexible member on said cylinder members at zones located at right angles to the direction of lateral movement, said means comprising crescent shaped elastic bodies of low shearing stiffness set into the walls of said cylindrical members.

3. An air spring comprising an outer cylindrical member closed at one end, an inner cylindrical member closed at one end, means mounting said cylinders for relative vertical and lateral movement, a U-shaped flexible member secured at the ends of the legs of the U to said inner and outer cylinders, and means for reducing the rubbing of said flexible member on said cylindrical members at zones located at right angles to the direction of lateral movement, said means comprising cylindrical elastic bodies of low shearing stiffness secured to the facing cylindrical walls.

References Cited by the Examiner

UNITED STATES PATENTS

| 1,403,466 | 1/1922 | Church | 267—65 |
| 2,725,078 | 11/1955 | Glancy | 267—65 |
| 2,749,943 | 6/1956 | Nemeth | 267—65 |
| 2,905,459 | 9/1959 | Fiske | 267—65 |
| 2,984,476 | 5/1961 | Turner | 267—65 |
| 2,988,353 | 6/1961 | Dietrich | 267—65 |

FOREIGN PATENTS

| 548,460 | 11/1957 | Canada. |
| 158,709 | 2/1921 | Great Britain. |
| 848,995 | 9/1960 | Great Britain. |
| 1,290,090 | 2/1962 | France. |

ARTHUR L. LA POINT, *Primary Examiner.*

H. R. FIELD, R. A. BERTSCH, *Assistant Examiners.*

UNITED STATES PATENT OFFICE
Certificate

Patent No. 3,257,107                                                   Patented June 21, 1966

Kunio Nishioka, Seiichi Nishimura, and Seinosuke Kato

Application having been made jointly by Kunio Nishioka, Seiichi Nishimura, and Seinosuke Kato, the inventors named in the patent above identified, and Sumitomo Metal Industries, Ltd., Osaka, Japan, a corporation of Japan, the assignee, for the issuance of a certificate under the provisions of Title 35, Section 256 of the United States Code, deleting the name of the said Seinosuke Kato from the patent as a joint inventor, and a showing and proof of facts satisfying the requirements of the said section having been submitted, it is this 21st day of November 1967, certified that the name of the said Seinosuke Kato is hereby deleted from the said patent as a joint inventor with the said Kunio Nishioka and Seiichi Nishimura.

[SEAL]

EDWIN L. REYNOLDS,
*First Assistant Commissioner of Patents.*